Patented Nov. 11, 1952

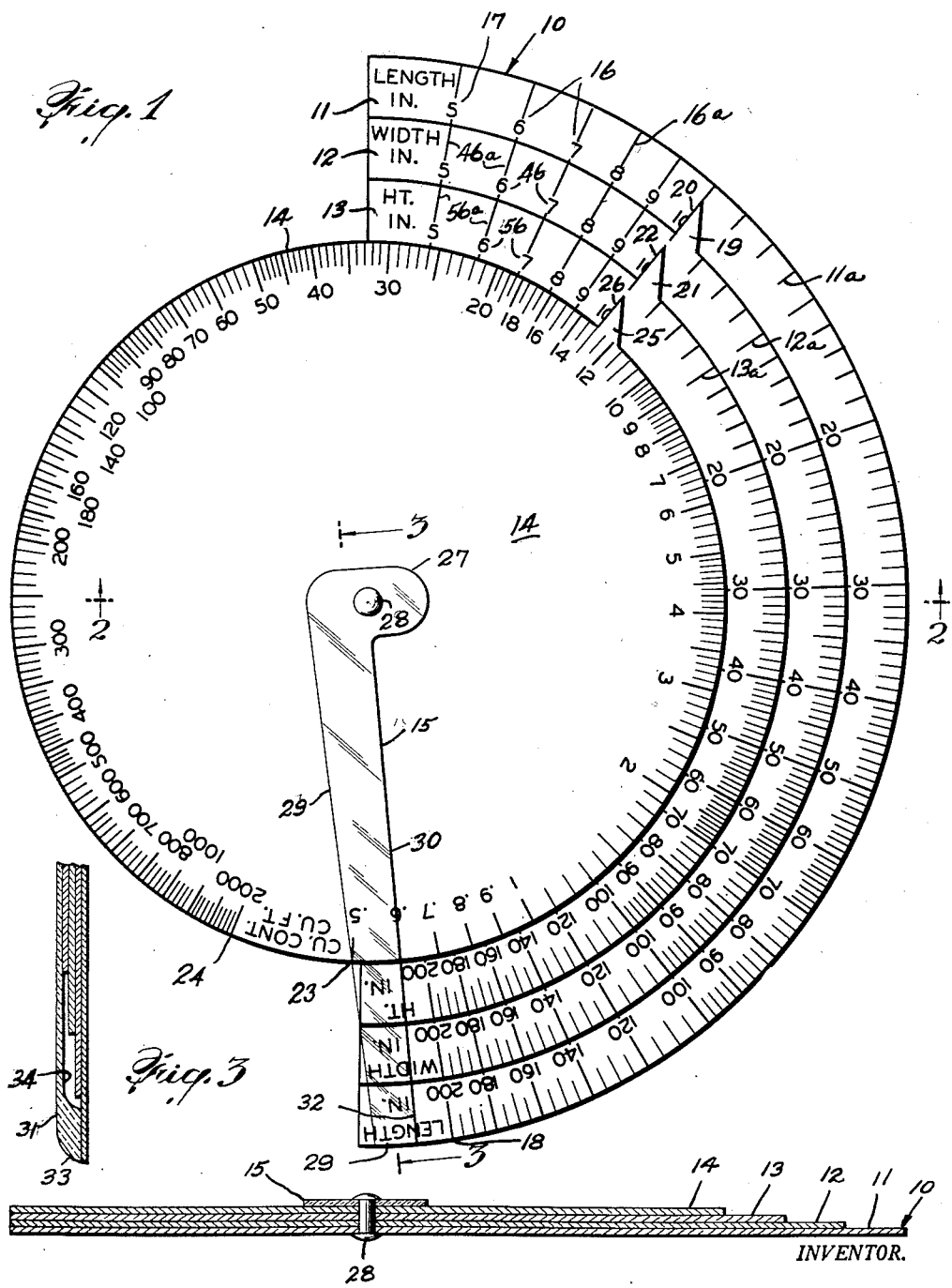

2,617,591

UNITED STATES PATENT OFFICE 2,617,591

CUBIC SIZE CALCULATOR

Julius B. Kupersmit, Brooklyn, N. Y.

Application February 14, 1951, Serial No. 210,934

1 Claim. (Cl. 235—84)

This invention relates generally to calculators and more particularly to a form of calculator capable of computing the cubic displacement of given rectangular solids.

While the conventional Mannheim type of slide rule may be used to compute the volume of an article of rectangular shape, if much of this computation is to be done, it is more efficient and convenient to use a calculator specifically constructed for this purpose.

It is therefore among the objects of this invention to provide a calculator in the use of which, when the dimensions of the article are known, the volume thereof may be easily computed.

Another object of the present invention lies in the provision of a calculator in which given the dimensions of the object in inches, the volume may be computed in feet without additional conversion from inches to feet.

Another object of this invention lies in the provision of a calculator which will be capable of the above and which will be of relatively small overall dimensions so as to be easily portable in the pocket of the user.

Still another object of this invention lies in the provision of a calculator which is simple in operation and which consequently may be readily used by those persons of little skill and knowledge of calculation, so that the chance of error is reduced to a minimum.

A further object of this invention lies in the provision of a calculator which may be easily constructed in large scale and at low cost, with consequent wide distribution and use.

A feature of the invention lies in the relatively stationary guide runner eliminating the necessity of additional motions involved when using the movable type.

On the drawing, in which similar reference characters indicate corresponding parts:

Figure 1 is a plan view of an embodiment of the invention.

Figure 2 is a vertical sectional view as seen from the plane 2—2 on Figure 1.

Figure 3 is a fragmentary vertical sectional view as seen from the plane 3—3 on Figure 1.

In accordance with the invention, the device generally indicated by reference character 10 includes generally a length indicating member 11, a width indicating member 12, a height indicating member 13, a volume indicating member 14, and a stationary guide member 15. These may be formed from any suitable material such as lithographed metal, stamped plastic or printed cardboard, the exact choice of material dependent upon the considerations of manufacturing cost.

As may be seen on Figure 1, the length indicating member 11 may be in the form of a semicircular disk having a scale 11a including a series of numbers 16 and indicating lines 16a designating the number of inches which a given article may have. As shown, the numbers start with a numeral five at 17, and progress to a maximum of two hundred at 18. This is merely a matter of convenience, however, and if desired other limits may be chosen. The numerals are not positioned at equally spaced intervals, but according to the logarithm of the numbers.

The width indicating member 12 having a scale 12a is of similar shape, having corresponding numbers 46 and subdivision lines 46a radially aligned when the device is assembled and adjusted as seen in Figure 1. The overall radius of this member is somewhat smaller than that of the length indicating member 11, to allow both sets of numerals and lines to be viewed simultaneously. Member 12, however, is provided with a radially extending indicating tab 19, located between the lines corresponding to 10 and 11 inches. The indicating edge 20 of the tab 19 is positioned so as to provide the equivalent of an extension of the line corresponding to 10 inches.

The height indicating member 13 having a scale 13a is similar to the width indicating member 12, but has a still smaller overall radius to allow simultaneous visibility with the members 11 and 12. The scale 12a has corresponding numbers 56 and subdivision lines 56a radially aligned when the device 10 is assembled and adjusted as seen in Figure 1.

The volume indicating member 14, unlike the previously described members is comprised of a fully circular shaped piece of material. Although it may be calibrated to read in cubic inches, I have found it most practical to calibrate this scale in units of cubic feet. This scale starts at 23 with the indicating character .5, and proceeds in a counterclockwise manner to its terminus at 24 with the indicating character 2000. Like the other scales the indicating characters are positioned to represent the logarithm of the number rather than the number itself. Since the scale represents cubic feet in the preferred embodiment, the logarithms must be represented by a scale somewhat different from that of members 11—13, or in mathematical terms, the position of the scale is shifted to include the equivalent of subtracting the logarithm of 1728 to convert cubic inches to cubic feet. The indicating tab 25 is positioned between the lines designating 12 and 13, with the indicating edge 26 forming an extension of the line designating 13.

The stationary guide member 15, although permissibly fashioned from any suitable material, is perhaps best formed from a light transmitting material such as synthetic resin, often called plastic. It is shown to be somewhat L-shaped, having a short arm 27 through which the rivet 28 may pass, and a longer arm 29, which serves to indicate the final solution to any particular problem. This shape permits an imaginary extension of the indicating edge 30 to pass through the axis of rotation at the center of the rivet 28, thus assuring that the edge 30 will exactly superpose any line on the other members lying exactly beneath it. The outward end 31 of the member 15 is suitably secured at an index line 32 on member 11, as shown on Figure 3. If the device is formed of plastic the parts may be easily cemented. In the case of the device made from heavy paper or cardboard, a staple will be found to be satisfactory. Any other suitable means of interconnecting the end 31 to the member 11 may be used.

As may be seen on Figure 2 the members 11, 12, 13, 14 and 15 are all movably and rotatably interconnected by the rivet 28 which passes through the center of each member. Unnecessary rubbing is eliminated by providing member 15 with a thickened portion 33, which forms a recess 34, in which members 12, 13 and 14 may be easily moved relative to each other.

The operation of the device is as follows. The length, width and height of the object to be measured are carefully determined in inch units or fractions thereof, which may be approximated. This accomplished, member 12 is rotated until the edge 20 is aligned with the indicating line designating the proper number of inches of length on the member 11. Holding member 12 fast with respect to member 11, the member 13 is rotated with respect to member 12 until the indicating edge 22 is aligned with the line indicating the number of inches of width of the object. Holding the member 13 stationary with respect to member 12, member 14 is rotated until the indicating edge 26 is aligned with the line indicating the number of inches of height of the object. The answer to the problem is read as that quantity indicated by the edge 30 on the scale of member 14. In Figure 3 the device has been set for a cube ten inches square. As indicated by reference character 75 the cubic content is .578 feet.

I wish it to be understood that I do not desire to be limited to the exact details of structure as set forth in this specification, for obvious modifications will occur to those skilled in the art to which the present invention pertains.

I claim:

A calculator for use in determining the volume in cubic feet of a rectangular solid, the dimensions of which are known in inches comprising: a length scale graduated in logarithmic proportion; a width scale graduated in logarithmic proportion, and movable with respect to said length scale; a height scale graduated in logarithmic proportion, and movable with respect to said length and width scales; a volume scale graduated in logarithmic proportion, and movable with respect to said length, width and height scales, the index of which is spaced to provide the equivalent of logarithmic subtraction of a constant; and an indicating guide member fixed with respect to said length scale and having an indicating line which extends over said volume scale; whereby when the inch dimensions are set on said first three mentioned scales, said volume scale may automatically indicate the product of said three dimensions in cubic feet.

JULIUS B. KUPERSMIT.

REFERENCES CITED

The following references are of record in the file of this patent:

UNITED STATES PATENTS

| Number | Name | Date |
| --- | --- | --- |
| 736,481 | Betts | Aug. 18, 1903 |
| 1,145,706 | Schulte | July 6, 1915 |
| 1,461,975 | Eaton et al. | July 17, 1923 |

FOREIGN PATENTS

| Number | Country | Date |
| --- | --- | --- |
| 3,059 | Great Britain | Aug. 2, 1873 |

OTHER REFERENCES

"Special Slide Rules," by J. N. Arnold, published by Purdue University of Lafayette, Indiana in 1933; pages 18–29.